United States Patent
Suciu et al.

(10) Patent No.: US 8,826,641 B2
(45) Date of Patent: Sep. 9, 2014

(54) THERMAL MANAGEMENT SYSTEM INTEGRATED PYLON

(75) Inventors: Gabriel L. Suciu, Glastonbury, CT (US); Brian D. Merry, Andover, CT (US); Christopher M. Dye, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 1529 days.

(21) Appl. No.: 12/020,728

(22) Filed: Jan. 28, 2008

(65) Prior Publication Data

US 2009/0188232 A1 Jul. 30, 2009

(51) Int. Cl.
| | | |
|---|---|---|
| *F02K 3/02* | (2006.01) | |
| *F02K 99/00* | (2009.01) | |
| *F02C 6/08* | (2006.01) | |
| *F02K 3/06* | (2006.01) | |
| *F02C 7/14* | (2006.01) | |
| *F02C 7/18* | (2006.01) | |
| *B64D 33/10* | (2006.01) | |
| *B64D 27/18* | (2006.01) | |
| *F02C 7/224* | (2006.01) | |
| *F02K 3/115* | (2006.01) | |
| *B64D 29/00* | (2006.01) | |

(52) U.S. Cl.
CPC ... *F02K 3/06* (2013.01); *F02C 6/08* (2013.01); *F02C 7/14* (2013.01); *F02C 7/185* (2013.01); *B64D 33/10* (2013.01); *Y02T 50/44* (2013.01); *B64D 27/18* (2013.01); *Y02T 50/671* (2013.01); *F02C 7/224* (2013.01); *F02K 3/115* (2013.01); *B64D 29/00* (2013.01); *Y02T 50/675* (2013.01)

USPC ............................................. 60/266; 60/226.1

(58) Field of Classification Search
USPC ........ 60/266, 785, 226.1, 39.08, 39.093, 728; 244/134 R, 134 B
See application file for complete search history.

(56) References Cited

U.S. PATENT DOCUMENTS

| | | | | |
|---|---|---|---|---|
| 3,842,597 A | * | 10/1974 | Ehrich ......................... | 60/226.1 |
| 4,254,618 A | * | 3/1981 | Elovic .......................... | 60/226.1 |
| 4,437,627 A | * | 3/1984 | Moorehead .................... | 244/54 |
| 4,463,552 A | * | 8/1984 | Monhardt et al. ........... | 60/226.1 |
| 5,123,242 A | * | 6/1992 | Miller .......................... | 60/226.1 |
| 5,203,163 A | * | 4/1993 | Parsons ........................ | 60/226.1 |
| 5,269,135 A | * | 12/1993 | Vermejan et al. ............ | 60/226.1 |
| 5,357,742 A | * | 10/1994 | Miller ............................ | 60/785 |
| 5,363,641 A |  | 11/1994 | Dixon et al. |  |
| 5,414,992 A |  | 5/1995 | Glickstein |  |

(Continued)

FOREIGN PATENT DOCUMENTS

| | | |
|---|---|---|
| EP | 0469825 | 2/1992 |
| EP | 1882824 | 1/2008 |
| GB | 2437295 | 10/2007 |

OTHER PUBLICATIONS

Extended European Search Report, dated May 31, 2011, EP Application No. 09250179.0.

*Primary Examiner* — Gerald L Sung

(74) *Attorney, Agent, or Firm* — Carlson, Gaskey & Olds P.C.

(57) ABSTRACT

A thermal management system includes at least one heat exchanger in communication with a bypass flow of a gas turbine engine. The placement of the heat exchanger(s) minimizes weight and aerodynamic losses and contributes to overall performance increase over traditional ducted heat exchanger placement schemes.

18 Claims, 9 Drawing Sheets

(56) References Cited

U.S. PATENT DOCUMENTS

| | | | |
|---|---|---|---|
| 5,452,573 A * | 9/1995 | Glickstein et al. | 60/782 |
| 5,511,374 A * | 4/1996 | Glickstein et al. | 60/782 |
| 5,729,969 A * | 3/1998 | Porte | 60/226.1 |
| 5,943,856 A | 8/1999 | Lillibridge et al. | |
| 6,105,370 A | 8/2000 | Weber | |
| 6,182,435 B1 | 2/2001 | Niggemann et al. | |
| 6,185,925 B1 | 2/2001 | Proctor et al. | |
| 6,330,995 B1 | 12/2001 | Mangeiga et al. | |
| 6,401,448 B1 | 6/2002 | Manteiga et al. | |
| 6,415,595 B1 | 7/2002 | Wilmot, Jr. et al. | |
| 6,516,606 B2 | 2/2003 | Fournier et al. | |
| 6,607,165 B1 | 8/2003 | Manteiga et al. | |
| 6,651,441 B2 | 11/2003 | Reuter et al. | |
| 6,708,925 B2 | 3/2004 | Udall | |
| 6,939,392 B2 | 9/2005 | Huang et al. | |
| 7,021,585 B2 | 4/2006 | Loewenstein et al. | |
| 7,055,303 B2 | 6/2006 | Macfarlane et al. | |
| 7,063,503 B2 | 6/2006 | Meisels | |
| 7,063,505 B2 | 6/2006 | Czachor | |
| 7,107,756 B2 | 9/2006 | Rolt | |
| 7,229,247 B2 | 6/2007 | Durocher et al. | |
| 7,229,249 B2 | 6/2007 | Durocher et al. | |
| 7,260,926 B2 | 8/2007 | Sabatino et al. | |
| 7,810,311 B2 * | 10/2010 | Schwarz et al. | 60/266 |
| 2007/0130912 A1 * | 6/2007 | Kraft et al. | 60/226.1 |
| 2007/0245739 A1 | 10/2007 | Stretton | |
| 2008/0028763 A1 | 2/2008 | Schwarz | |
| 2008/0112798 A1 * | 5/2008 | Seitzer et al. | 415/144 |
| 2008/0230651 A1 * | 9/2008 | Porte | 244/118.5 |
| 2009/0000305 A1 * | 1/2009 | Porte et al. | 60/782 |
| 2009/0007567 A1 * | 1/2009 | Porte et al. | 60/785 |
| 2009/0165995 A1 * | 7/2009 | Bajusz et al. | 165/51 |
| 2009/0188234 A1 * | 7/2009 | Suciu et al. | 60/262 |

* cited by examiner

THERMAL MANAGEMENT SYSTEM INTEGRATED PYLON

BACKGROUND OF THE INVENTION

The present invention relates to Thermal Management Systems (TMS), and more particularly to a TMS within a bifurcation area of a gas turbine engine.

Thermal Management Systems (TMS) include heat exchangers and associated equipment which exchange gas turbine engine heat with an airflow or fuel flow. The gas turbine engine architecture typically dictates TMS heat exchanger placement. Conventional TMS heat exchanger locations may partially interrupt the thrust airflow through the engine.

One conventional TMS heat exchanger placement is typically within a core cowl area and axially deep within a fan cowl. The heat exchanger airflow is ducted inward toward the engine centerline through the heat exchanger, then ducted outward to merge with the bypass stream. Such ducts may be relatively long and serpentine to guide the heat exchanger airflow away from, then back into the bypass flow. Furthermore, this configuration may introduce mixing losses, which may detract from the engine efficiency.

SUMMARY OF THE INVENTION

A thermal management system for a gas turbine engine according to an exemplary aspect of the present invention includes at least one heat exchanger mounted within a bifurcation area in communication with a bypass flow of the gas turbine engine.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows.

DETAILED DESCRIPTION OF THE DISCLOSED EMBODIMENT

Figure 1A:
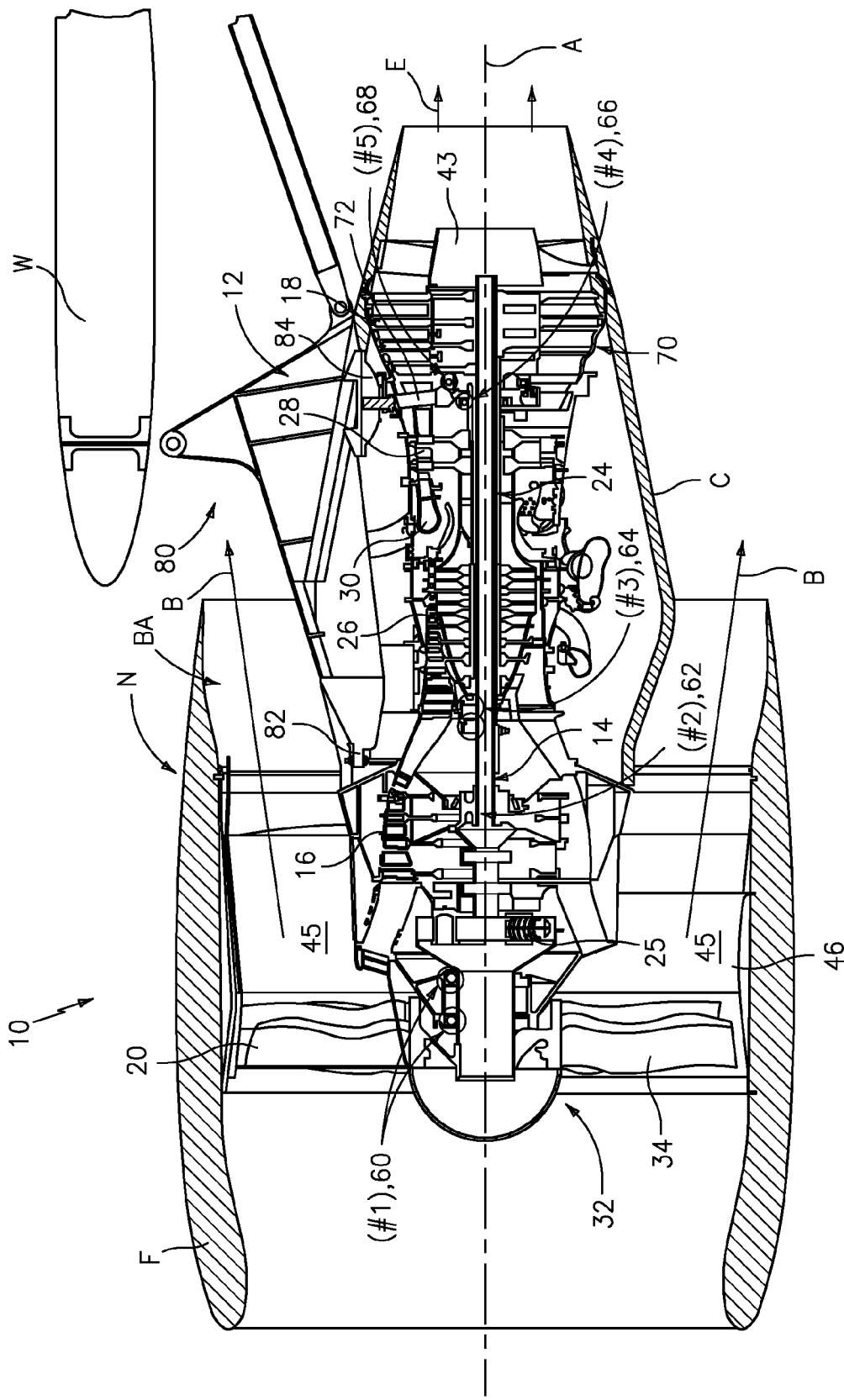
FIG. 1A is a general sectional view through a gas turbine engine along the engine longitudinal axis.

FIG. 1A illustrates a general partial fragmentary schematic view of a gas turbine engine 10 suspended from an engine pylon structure 12 within an engine nacelle assembly N as is typical of an aircraft designed for subsonic operation. It should be understood that although a particular component arrangement is disclosed in the illustrated embodiment, various pylon structures 12 and nacelle assemblies N will benefit herefrom.

The engine 10 includes a core engine within a core nacelle C that houses a low spool 14 and high spool 24. The low spool 14 generally includes a low pressure compressor 16 and low pressure turbine 18. The low spool 14 drives a fan section 20 connected to the low spool 14 either directly or through a gear train 25.

The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 in the disclosed non-limiting embodiment is a high-bypass geared architecture aircraft engine where the engine 10 bypass ratio is greater than ten (10:1), the turbofan diameter is significantly larger than that of the low pressure compressor 16, and the low pressure turbine 18 has a pressure ratio that is greater than 5:1. The gear train 25 may be an epicycle gear train such as a planetary gear system or other gear system with a gear reduction ratio of greater than 2.5:1. It should be understood, however, that the above parameters are only exemplary of one non-limiting embodiment of a geared architecture engine and that the present invention is applicable to other gas turbine engines including direct drive turbofans.

Airflow enters the fan nacelle F which at least partially surrounds the core nacelle C. The fan section 20 communicates airflow into the core nacelle C to the low pressure compressor 16. Core airflow compressed by the low pressure compressor 16 and the high pressure compressor 26 is mixed with the fuel in the combustor 30 ignited, and burned. The resultant high pressure combustor products are expanded through the high pressure turbine 28 and low pressure turbine 18. The turbines 28, 18 are rotationally coupled to the compressors 26, 16 respectively to drive the compressors 26, 16 in response to the expansion of the combustor product. The low pressure turbine 18 also drives the fan section 20 through gear train 25.

A core engine exhaust E exits the core nacelle C through a core nozzle 43 defined between the core nacelle C and a tail cone 33. A bypass flow path 45 is defined between the core nacelle C and the fan nacelle F. The engine 10 generates a high bypass flow arrangement with a bypass ratio in which approximately 80 percent of the airflow entering the fan nacelle 34 becomes bypass flow B. The bypass flow B communicates through the generally annular bypass flow path 45.

Figure 1B:
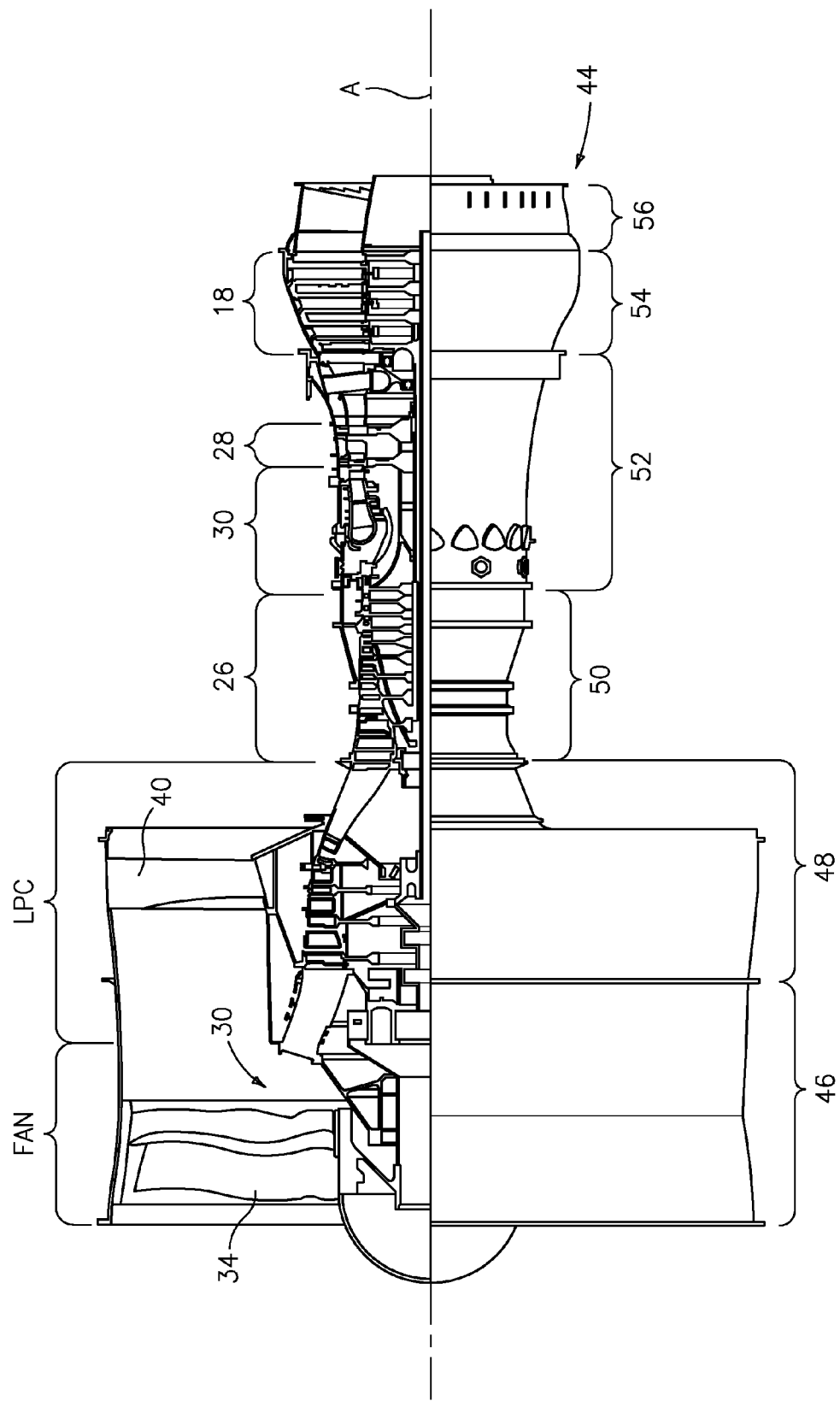
FIG. 1B is a general sectional view through a gas turbine engine along the engine longitudinal axis illustrating an engine static structure case arrangement on the lower half thereof.

An engine static structure 44 generally has sub-structures including a case structure often referred to as the engine backbone. The engine static structure 44 generally includes a fan case 46, an intermediate case (IMC) 48, a high pressure compressor case 50, a combustor case 52, a low pressure turbine case 54, and a turbine exhaust case 56 (FIG. 1B). The fan section 20 includes a fan rotor 32 with a plurality of circumferentially spaced radially outwardly extending fan blades 34. The fan blades 34 are surrounded by the fan case 46.

The core engine case structure is secured to the fan case 46 at the IMC 48 which includes a multiple of circumferentially spaced radially extending struts 40 which radially span the core engine case structure and the fan case 46. The core nacelle 12 is at least partially supported within the fan nacelle by structure often generically referred to as Fan Exit Guide Vanes (FEGVs), upper bifurcations, lower bifurcations or such like.

The engine static structure 44 further supports a bearing system upon which the turbines 28, 18, compressors 26, 16 and fan rotor 32 rotate. A #1 fan dual bearing 60 which rotationally supports the fan rotor 32 is axially located generally within the fan case 46. The #1 fan dual bearing 60 is preloaded to react fan thrust forward and aft (in case of surge). A #2 LPC bearing 62 which rotationally supports the low spool 14 is axially located generally within the intermediate case (IMC) 48. The #2 LPC bearing 62 reacts thrust. A #3 high spool thrust bearing 64 which rotationally supports the high spool 24 and also reacts thrust. The #3 high spool bearing 64 is also axially located generally within the IMC 48 just forward of the high pressure compressor case 50. A #4 bearing 66 which rotationally supports a rear segment of the high spool 14 reacts only radial loads. The #4 bearing 66 is axially located generally within the combustor case 52 in an aft section thereof. A #5 bearing 68 rotationally supports the rear segment of the low spool 14 and reacts only radial loads. The #5 bearing 68 is axially located generally within the combustor case 52 just aft of the #4 bearing 66. It should be understood that this is an exemplary configuration and any number or combination of bearings may be utilized.

The #4 bearing 66 and the #5 bearing 68 are supported within a mid-turbine frame (MTF) structure 70 to straddle radially extending structural struts 72 which are preloaded in tension. The MTF 70 provides aft structural support within the combustor case 52 for the #4 bearing 66 and the #5 bearing 68 which rotatably support the spools 14, 24.

A dual rotor engine such as that disclosed in the illustrated non-limiting embodiment typically includes a forward frame and a rear frame that support the main rotor bearings. The intermediate case (IMC) 48 also includes the radially extending structural struts 40 which are generally radially aligned with the #2 LPC bearing 62 (FIG. 1A). It should be understood that various engines with various case and frame structures will benefit herefrom.

The engine 10 is mounted to aircraft structure such as an aircraft wing W through an engine mounting configuration 80 defined by the pylon structure 12. The engine mounting configuration 80 includes a forward mount 82 and an aft mount 84. That is, the pylon structure 12 may include various braces, struts and such like which are surrounded at least in part by an aerodynamic fairing structure. The forward mount 82 is secured to the IMC 48 and the aft mount 84 is secured to the MTF 70 at the thrust case 52. The forward mount 82 and the aft mount 84 are arranged in a plane containing the axis A of the turbofan gas turbine 10. This eliminates thrust links from the intermediate case, which frees up valuable space beneath the core nacelle and minimizes IMC 48 distortion.

Figure 2A:
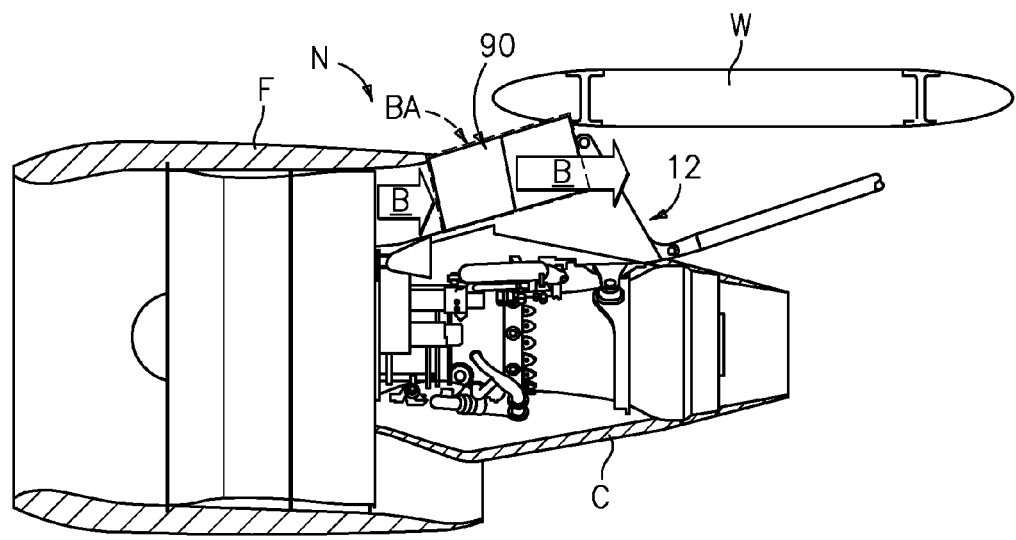
FIG. 2A is a side partial sectional view of a thermal management system.
Figure 3:
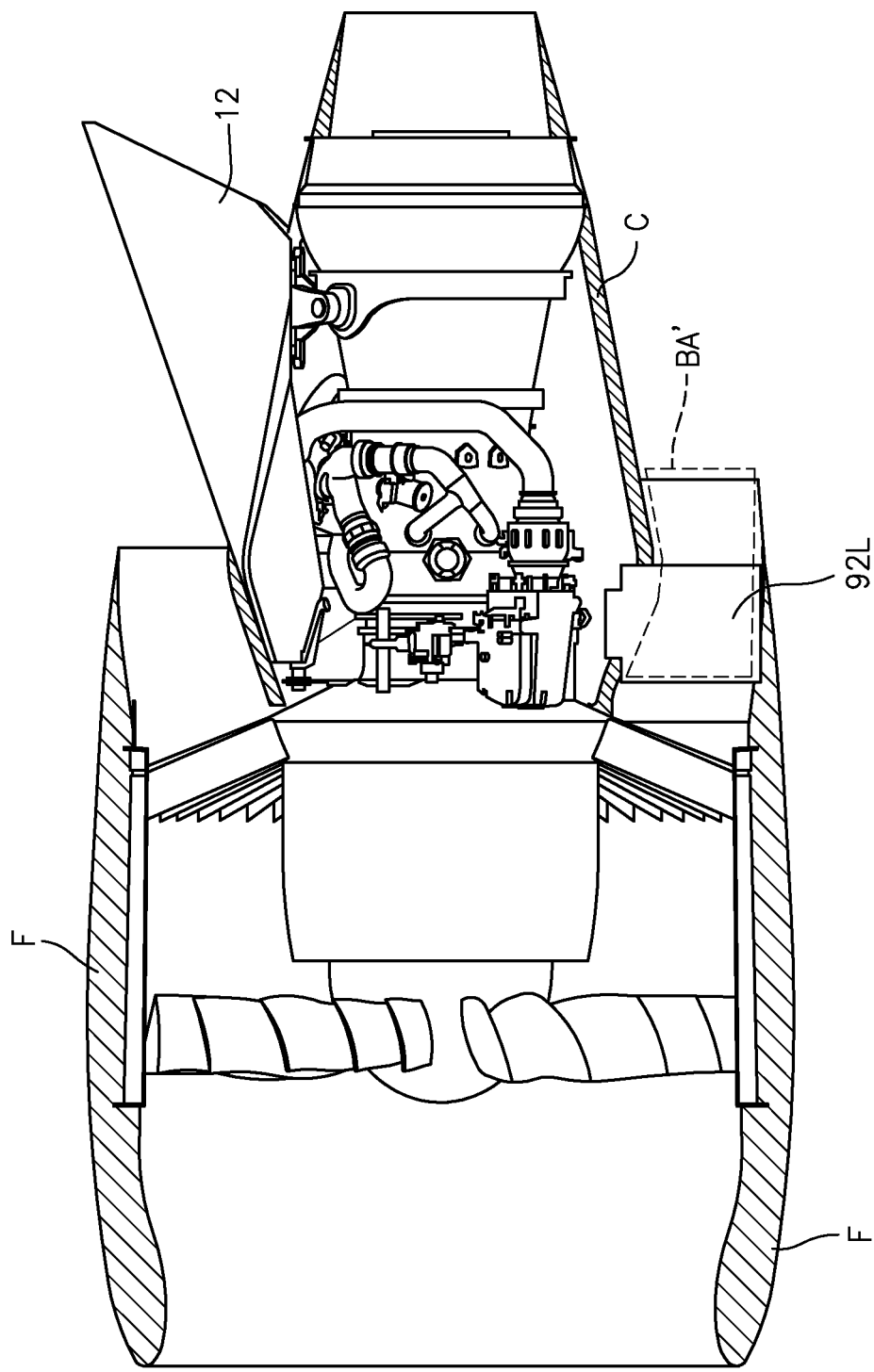
FIG. 3 is a side partial sectional view of a lower bifurcation area.

Referring to FIG. 2A, a thermal management system (TMS) 90 is at least partially integrated adjacent the nacelle assembly N, the engine pylon structure 12 and the upper bifurcation (bifi) 92U. This area is generally referred to herein as a bifurcation area BA. It should be understood that the TMS 90 may be located at least partially forward of the pylon 12, at least partially within the pylon structure 12, at least partially within the upper bifurcation 92U or any combination thereof but still considered as located within the bifurcation area BA as defined herein. Alternatively, if located within a lower section of the engine such as in a lower bifurcations 92L, this area too may be considered as located within a bifurcation area BA' as defined herein (FIG. 3). That is, the TMS 90 may be arranged in various axial positions such that a plane which passes through the engine centerline A and the pylon structure 12 also passes through the TMS 90.

Figure 2B:
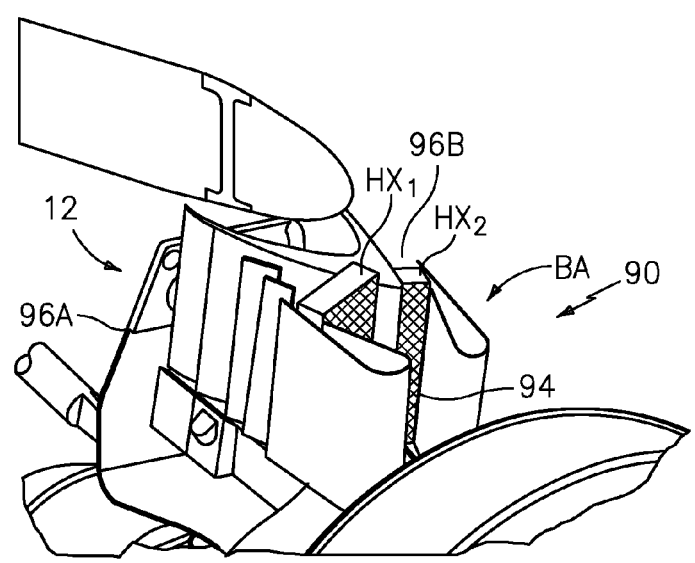
FIG. 2B is a top rearward perspective view of the thermal management system of FIG. 2A.

The TMS 90 in one non-limiting embodiment, includes a first heat exchanger HX1 and a second heat exchanger HX2 (FIG. 2B) in communication with the bypass flow path 45 through an inlet 94 and an exit 96. The bypass flow B is communicated from the inlet 94 adjacent a trailing edge of the fan nacelle F to exit though the exit 96 generally above the pylon structure 12 and toward the wing W such that this embodiment may be referred to as an "above pylon" engine installation. Axial and lateral space within the engine pylon structure 12 locates the heat exchangers HX1, HX2 in the bypass flow path 45 facilitate packaging of the TMS 90 and achieve cooling airflow requirements.

It should be understood that the heat exchangers HX1, HX2 may be air/fluid, fluid/fluid, or air/air heat exchangers. Air/fluid heat exchangers are typically utilized to cool engine fluids to maintain low temperatures. Fluids may be oil used to lubricate engine components such as bearings and gears, or fuel. Fluid/fluid exchangers are typically utilized to preheat engine fuel before combustion to increase cycle efficiency. Air/air heat exchangers are typically utilized to cool high-temperature engine air for use in the aircraft cabin.

Figure 2C:
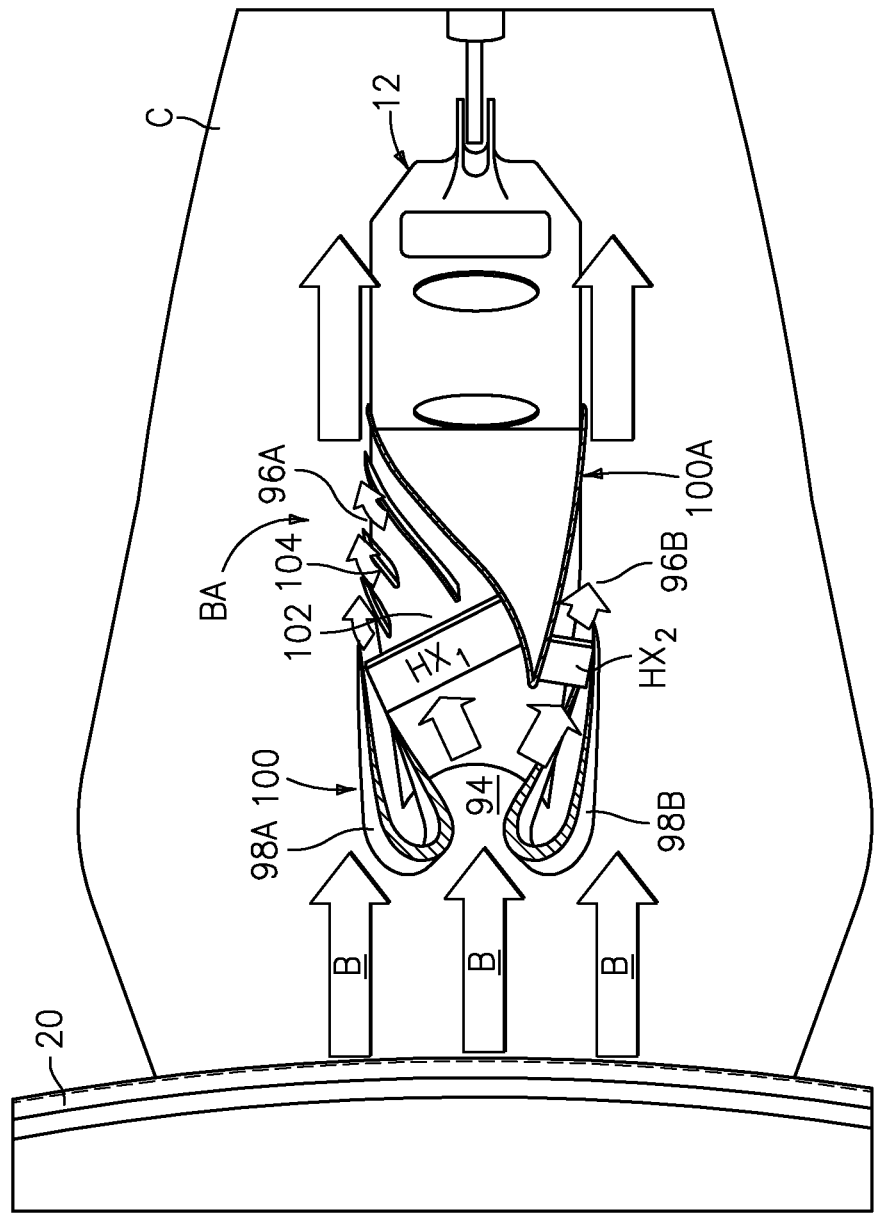
FIG. 2C is a top sectional view of the thermal management system of FIG. 2A.

Referring to FIG. 2C, a set of inlet guide vanes 98A, 98B define the inlet 94 such that the heat exchangers HX1, HX2 may be located in a common area to share the inlet 94. Inlet air may be split into the respective heat exchangers HX1, HX2 by a vane structure 100 in response to desired heat exchanger airflow requirements. The vane structure 100 includes a guide vane 100A between the heat exchangers HX1, HX2 that provides for passage of conduits, wiring harness, piping and such like between the engine 10 and the wing W.

Figure 2D:
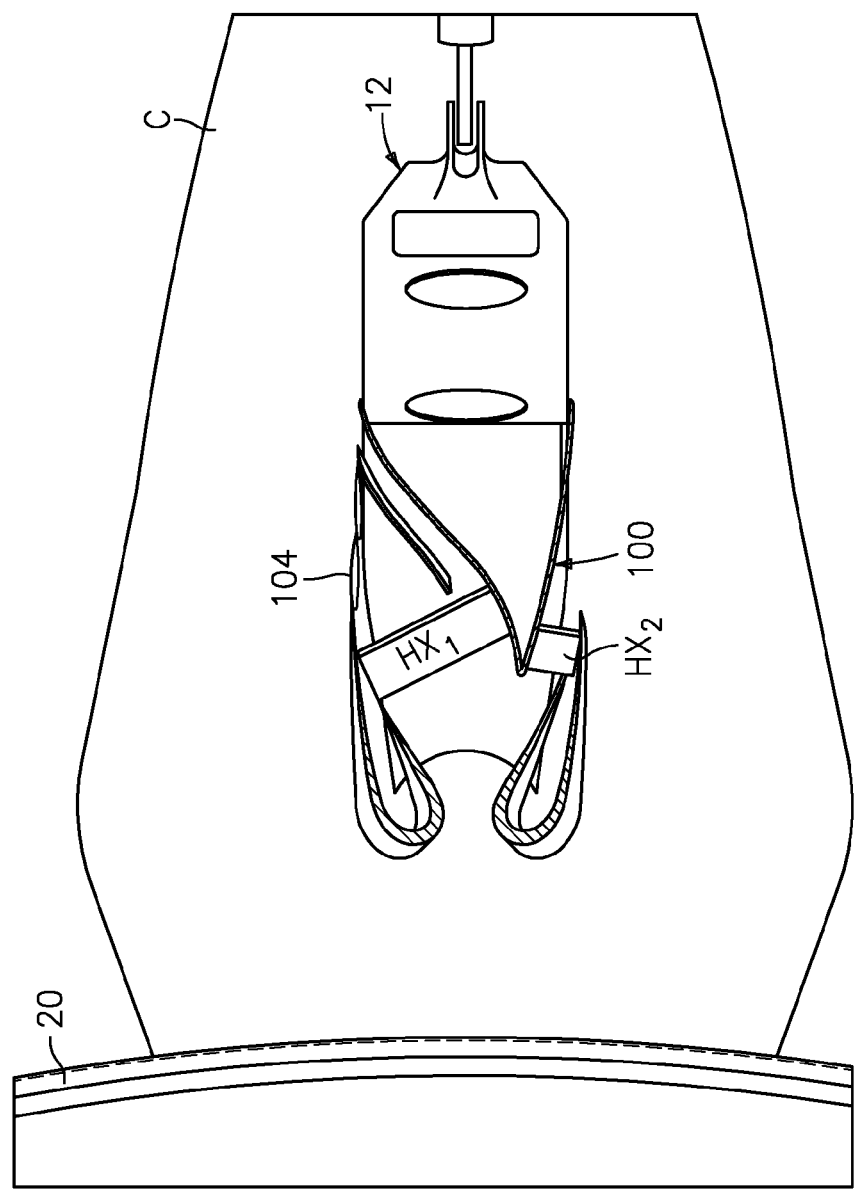
FIG. 2D is a top sectional view of the thermal management system of FIG. 2A with modulated flow vanes moved toward a closed position.

The exit 96 in this non-limiting embodiment is split to communicate exit airflow through exits 96A, 96B along both sides of the pylon structure 12. Alternatively, or in addition thereto flow vanes 102 may be provided to guide the exit airflow. Furthermore, a set of modulated flow vanes 104 may be utilized to shutter or modulate the exit airflow to provide a desired backpressure or other flow control through the heat exchangers HX1, HX2. That is, in one example, should the modulated flow vanes 104 be moved toward a closed position (FIG. 2D), airflow though heat exchanger HX1 will decrease while airflow through heat exchanger HX2 will increase. It should be understood that although a particular inlet and exit arrangement is illustrated in the disclosed, non-limiting embodiment, various inlet and exit combinations which may include combinations of multiple as well as single inlet(s) and exit(s) will benefit herefrom.

Figure 4A:
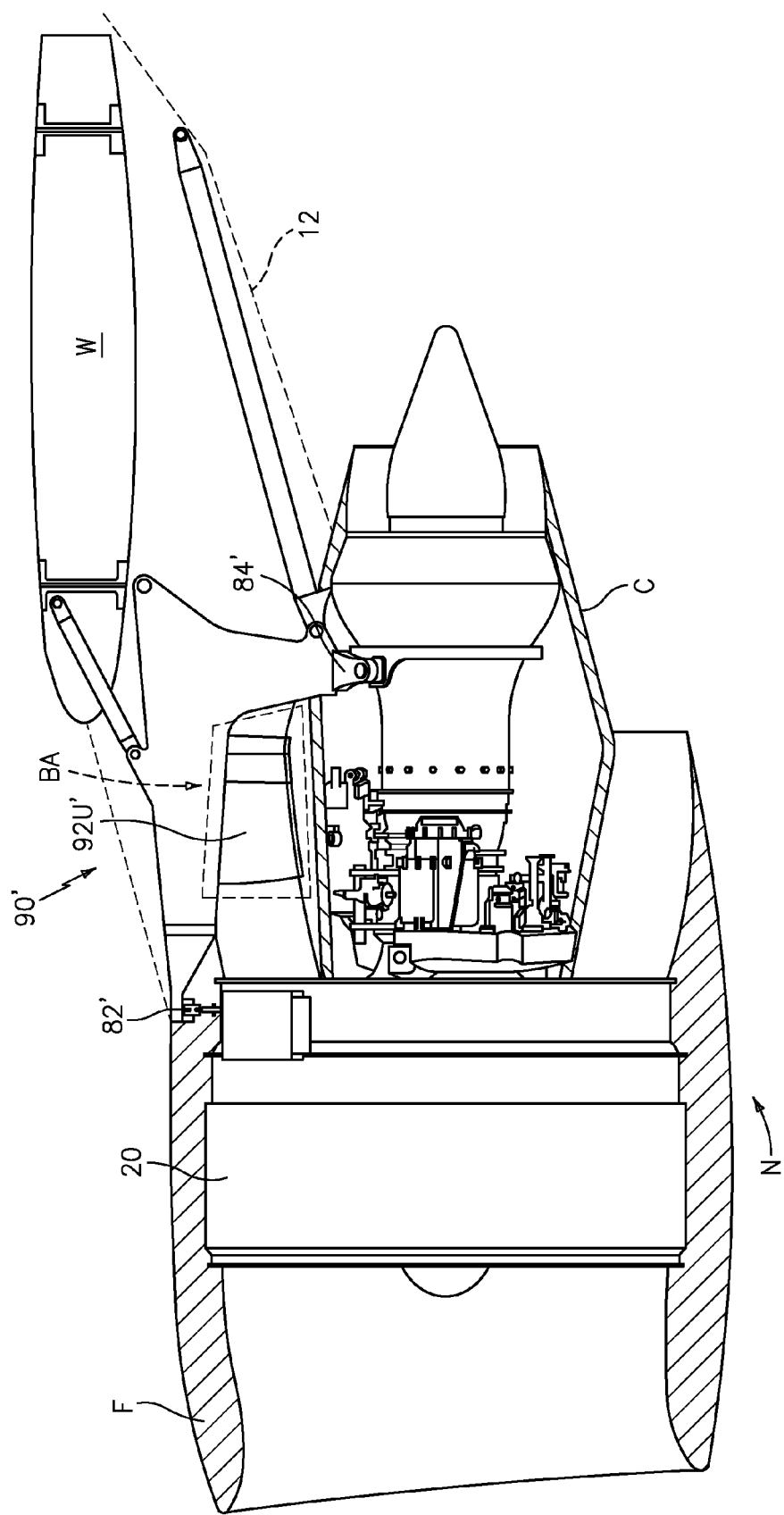
FIG. 4A is a side partial sectional view of another thermal management system.

Referring to FIG. 4A, another thermal management system (TMS) 90' is at least partially integrated within the nacelle assembly N and the engine pylon structure 12 in which the forward mount 82' is mounted to the outer periphery of the fan case 20. The TMS 90' in one non-limiting embodiment, includes a first heat exchanger HX1' and a second heat exchanger HX2' (FIG. 4B) in communication with the bypass flow path 45 through an inlet 94' and an exit 96' (FIG. 4C). The bypass flow B is communicated from the inlet 94' to the exit 96' generally parallel to the engine axis A. This arrangement may be referred to as a "below pylon" engine installation.

Figure 4B:
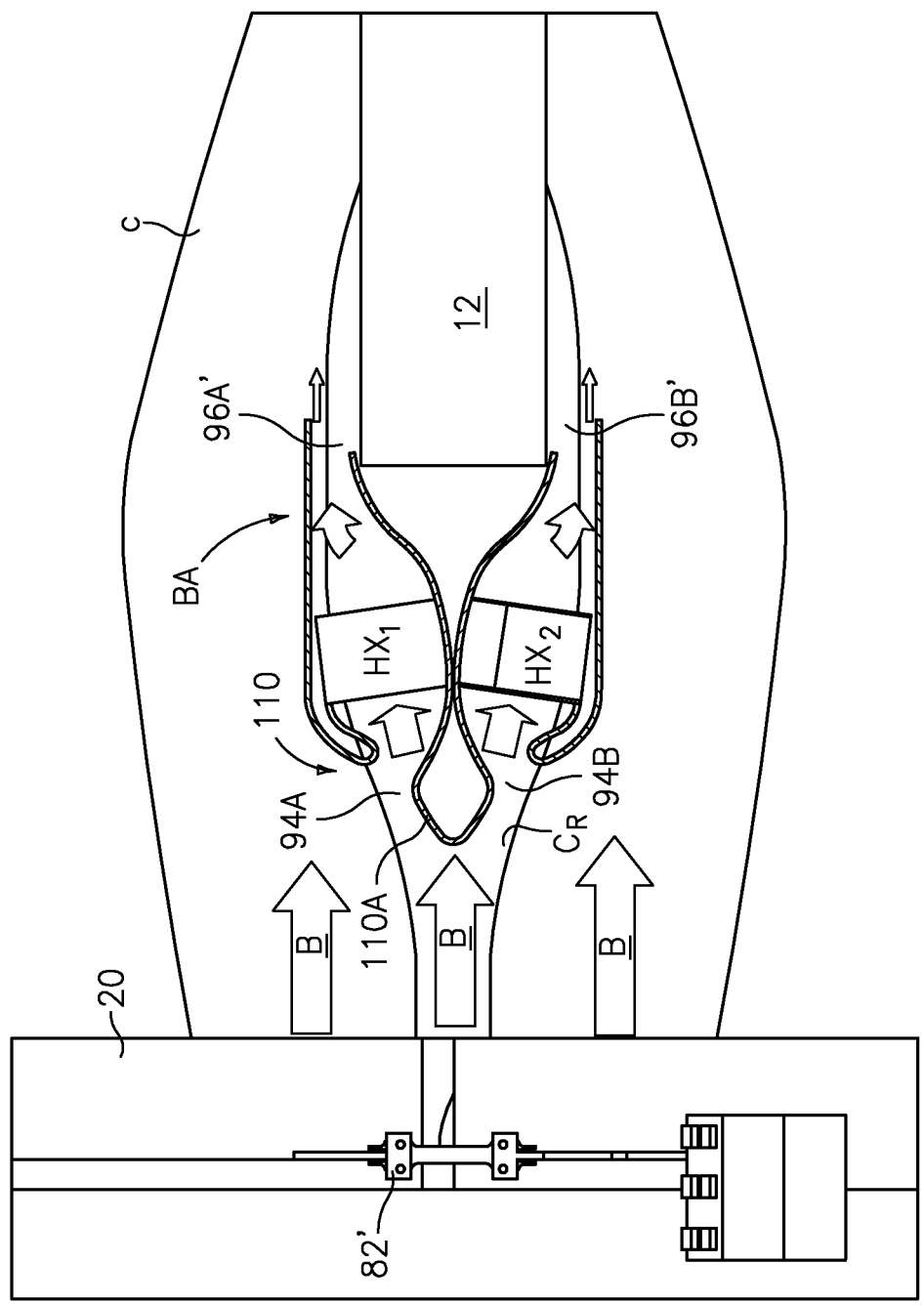
FIG. 4B is a top sectional view of the thermal management system of FIG. 3A.
Figure 4C:
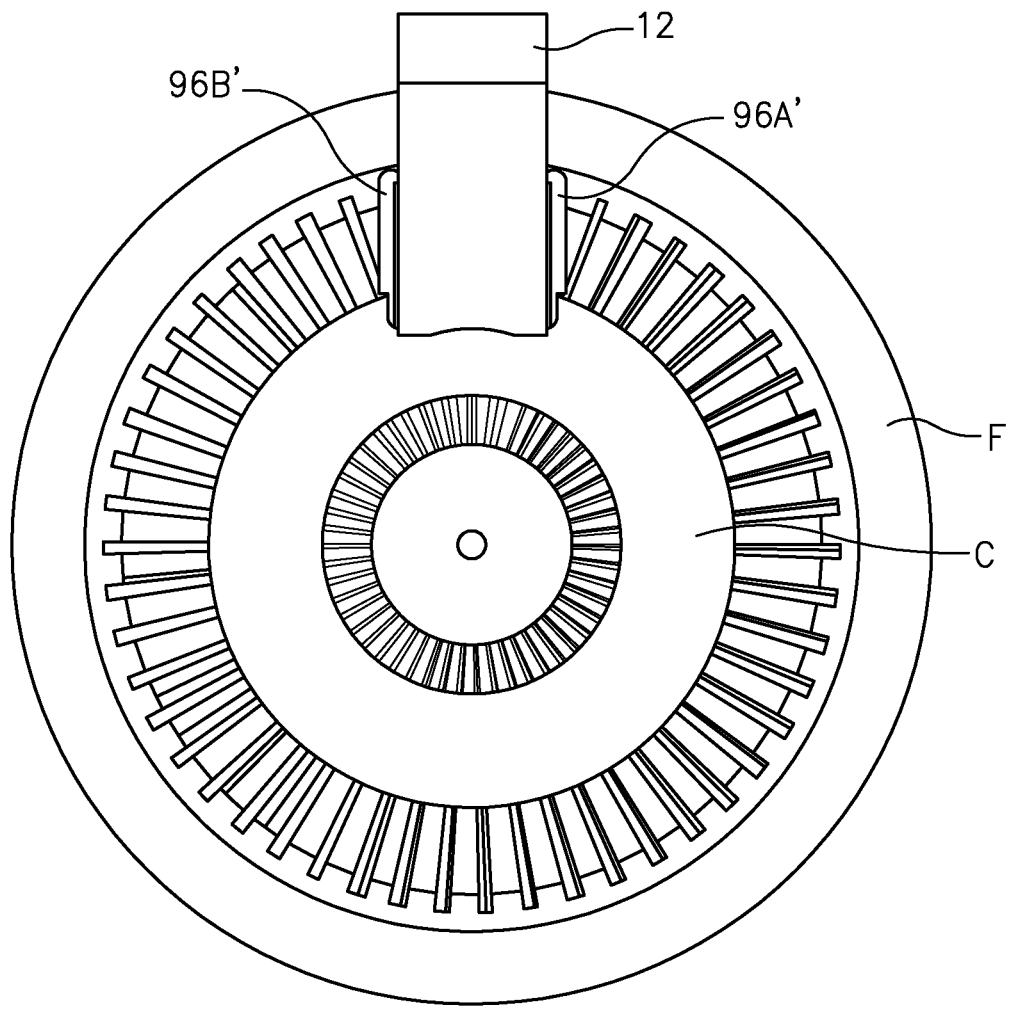
FIG. 4C is a rear view of the thermal management system of FIG. 3A.

Referring to FIG. 4B, the TMS 90' may be at least partially recessed CR into the core nacelle C. A set of inlet guide vanes 110 define the inlets 94A', 94B' such that the heat exchangers HX1', HX2' are located in separate plenums on either side of a central inlet guide vane 110A. The central inlet guide vane 110A facilitates avoidance of foreign object damage (FOD). Furthermore, the central inlet guide vane 110A provides an effective passage for conduits between the engine 10 and the wing W. The exit 96' in this non-limiting embodiment is split into exits 96A', 96B' to communicate exit airflow along both sides of the pylon structure 12 (FIG. 3C).

The TMS provides reduced weight as the required TMS support structure and plumbing are minimized since the heat exchangers are placed directly in the bypass flow path to reduce the length of required ducting. The heat exchanger may also be reduced in size when located in the bypass flow path as the heat exchangers operate in a cooler environment than when placed in the core, which may be a higher temperature area due in part to the temperatures generated by the burner, turbine, and high compressor. Bypass aerodynamic efficiency is also increased as mix area outside the nacelle duct zone decreases, decreasing fan bypass area mixing losses compared to unducted heat exchanger placement. Furthermore, the overall TMS space is reduced and combined into smaller overall volume due to close-positioning in a space with a more rectangular shape.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A thermal management system for a gas turbine engine comprising:
    a bifurcation area;
    at least one heat exchanger mounted within said bifurcation area in communication with a bypass flow from the gas turbine engine, said at least one heat exchanger positioned downstream of a fan strut, said fan strut spanning between a core nacelle of said gas turbine engine and a fan nacelle of said gas turbine engine;
    wherein said at least one heat exchanger includes first and second heat exchangers, said first and second heat exchangers mounted within a common plenum defined by said bifurcation area to share a common inlet; and
    wherein first and second exits are formed, in part, by a split in the plenum downstream of said inlet.

2. The system as recited in claim 1, wherein said bifurcation area is at least partially within a pylon structure.

3. The system as recited in claim 1, wherein said bifurcation area is forward of a pylon structure.

4. The system as recited in claim 1, wherein said bifurcation area is at least partially within a bifurcation.

5. The system as recited in claim 1, wherein said at least one heat exchanger is mounted at least partially within a pylon structure.

6. The system as recited in claim 1, wherein said at least one heat exchanger is mounted at least partially within an upper bifurcation.

7. The system as recited in claim 1, wherein said at least one heat exchanger is mounted forward of a pylon structure.

8. The system as recited in claim 3, wherein said at least one heat exchanger is mounted at least partially within an upper bifurcation.

9. The system as recited in claim 1, wherein at least one flow vane is positioned on one side of said split, downstream of one of said first and second heat exchangers, leading to one of said first and second exits.

10. The system as recited in claim 9, wherein said at least one flow vane includes a plurality of flow vanes, including a modulated flow vane to modulate an exit airflow.

11. The system as recited in claim 1, wherein said first and second heat exchangers are positioned on opposite sides of said split in said plenum.

12. The system as recited in claim 1, wherein said first and second heat exchangers are separate heat exchangers, and are spaced apart from one another.

13. A thermal management system for a gas turbine engine comprising:
    a bifurcation area;
    at least one heat exchanger mounted within said bifurcation area in communication with a bypass flow from the gas turbine engine;
    wherein said at least one heat exchanger comprises a first heat exchanger and a second heat exchanger, said at least one heat exchanger positioned entirely downstream of an outlet of a fan case and a fan strut, said fan strut spanning between a core nacelle of said gas turbine engine and a fan nacelle of said gas turbine engine.

14. The system as recited in claim 13, wherein said first heat exchanger and said second heat exchanger are mounted within a common plenum defined by said bifurcation area to share a common inlet.

15. A thermal management system for a gas turbine engine comprising:
    a bifurcation area;
    at least one heat exchanger mounted within said bifurcation area in communication with a bypass flow from the gas turbine engine;
    wherein said at least one heat exchanger comprises a first heat exchanger and a second heat exchanger;
    wherein said first heat exchanger and said second heat exchanger are mounted within separate plenums on either side of a central inlet guide vane defined by said bifurcation area, said first heat exchanger and said second heat exchanger each being positioned downstream of a fan strut, said fan strut spanning between a core nacelle of said gas turbine engine and a fan nacelle of said gas turbine engine; and
    wherein said central inlet guide vane defines a first inlet for said first heat exchanger and a second inlet for said second heat exchanger.

16. The system as recited in claim 15, wherein said first heat exchanger and said second heat exchanger communicate through a respective first and second exit.

17. The system as recited in claim 15, wherein said central inlet guide vane is spaced downstream of a fan section of the gas turbine engine.

18. A thermal management system for a gas turbine engine comprising:
    a bifurcation area;
    at least one heat exchanger mounted within said bifurcation area in communication with a bypass flow from the gas turbine engine, said at least one heat exchanger positioned downstream of a fan strut, said fan strut spanning between a core nacelle of said as turbine engine and a fan nacelle of said gas turbine engine; and wherein said at least one heat exchanger is positioned entirely downstream of a fan case of said gas turbine engine.

* * * * *